Nov. 6, 1945. E. J. COLE 2,388,467

METHOD OF MAKING GRIP NUTS FROM PUNCHED BLANKS

Filed July 7, 1944

Inventor
EDWARD J. COLE,
By Leech o Radue,
Attorneys

Patented Nov. 6, 1945

2,388,467

UNITED STATES PATENT OFFICE 2,388,467

METHOD OF MAKING GRIP NUTS FROM PUNCHED BLANKS

Edward J. Cole, Peekskill, N. Y., assignor to Cole Machinery Mfg. Corp., New York, N. Y.

Application July 7, 1944, Serial No. 543,800

6 Claims. (Cl. 10—86)

This invention relates to a simplified method of making grip nuts of the type wherein the outer end of the threaded bore of the nut is converged to take up play between the threads of the nut and cooperating bolt or other threaded member. This general type of grip nut is shown in my prior Patents Nos. 1,905,621, 1,966,613, 2,337,030 and 2,337,372. These patents show various means of flaring the bore of punched standard straight sided nut blanks, threading the bore in its flared condition and thereafter pressing the sides of the nut to bring the side walls thereof back to their original straight side condition, so that the upper few threads of the nut converge.

In the present improved simplified method a standard nut is obtained which possesses the converging thread portion adjacent the crown of the nut and does away with the expensive handling and operational steps which are present in my prior patented methods.

Figure 1:
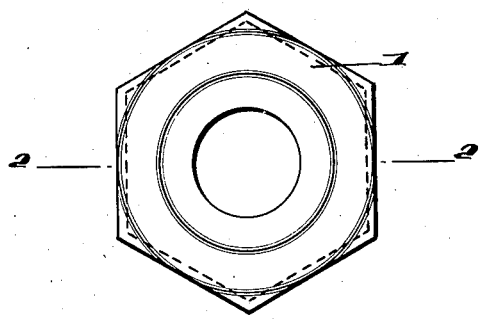
Fig. 1 is a top plan of a nut blank produced by the hot or cold punched process.
Figure 4:
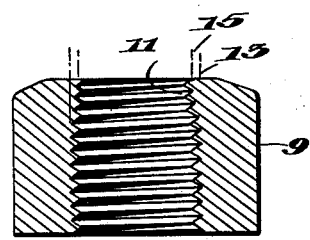
Fig. 4 shows the threaded nut after it has been pressed to bring its side walls into perpendicular relation.
Figure 2:
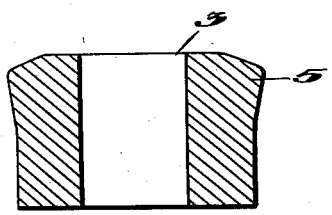
Fig. 2 is a sectional view of the punched nut blank showing the perpendicular bore and the flared top crown portion of the nut.
Figure 5:
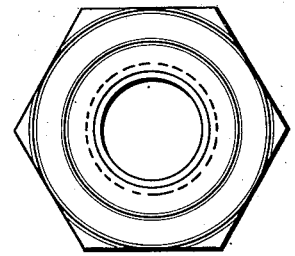
Fig. 5 is a top plan view of the finished nut.
Figure 3:
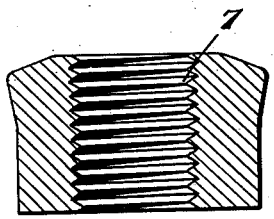
Fig. 3 illustrates the screw threading of the nut blank shown in Fig. 2.

In carrying out this method nut blanks are punched out of a hot or cold bar or rod by conventional means, but with this exception, that the upper part of the die is slightly flared, so that the resulting nut blank has a straight bore 3 therethrough, and with the upper outer sides 5 or crown portion slightly flared, as shown in Figs. 2 and 3. The flared blank is thereafter tapped with a standard depth thread 7 throughout the bore. The threaded nut blank is then placed in any convenient type press or other mechanism to straighten out the upper flare or bulge 5 so that the exterior of the finished nut has straight side walls 9, as found in a conventional nut. This pressing of the side walls of the nut to a perpendicular condition produces a nut having all the attributes of a standard nut as to size, wrench engaging surfaces and the like, but in addition the pressing or straightening action carries inwardly toward the axis of the threaded bore adjacent the upper threads 11 so that the diameter of the opening at the top of the nut is slightly less than at the bottom. This converging is shown in Fig. 4 by the dotted lines 13 and 15, where 13 represents the normal root line of the thread 7 and 15 represents the arcuate line of converging of the upper threads in the nut.

By following the teachings of this method, nut locks can be produced at a fraction of the cost of those heretofore manufactured, and the essence of the invention is the initial punching of the nut blank from the blank stock with a vertical bore therein and with slightly bulging upper side walls adjacent the crown portion which is accomplished simultaneously with the punching of the nut. After threading in a conventional manner the threaded flared blank is placed in any suitable type of apparatus to straighten the bulged outside walls of the nut, and consequently the thread's convolutions in this flared portion are slightly bent inwardly or converged with the root line of the thread thus treated lying in a uniform arc from the root line of the remainder of the thread convolutions.

I claim:

1. The method of forming grip nuts of the type having a constricted threaded bore adjacent the crown face of the nut comprising initially and simultaneously punching the nut blank from suitable stock with a uniform diameter central bore and a slightly outwardly flared crown portion, threading the bore, thereafter pressing the sides of the blank into parallelism to remove the flare from the crown portion and reduce the diameter of the adjacent end of the threaded bore.

2. The method of forming grip nuts of the type having a constricted threaded bore in the upper portion of the nut comprising simultaneously die punching apertured nut blanks with an outwardly tapered body whereby the blank is slightly wider through its crown portion than through the body of the nut, threading the apertured blank, thereafter pressing the tapered crown portion of the threaded blank only sufficiently to bring the body of the nut into vertical alignment with the side walls thereof in parallelism and the diameter of the adjacent end of the threaded bore reduced.

3. The method of producing grip nuts of the type having a constricted threaded bore in the upper portion of the nut which comprises simultaneously die punching the nut blanks with a uniform central bore and with outwardly flaring side walls of the upper half of the blank, uniformly threading the central bore of the nut and thereafter compressing the flaring side walls to bring said side walls into uniform parallel relation whereby the top portion of the threaded bore is reduced in diameter.

4. The method of making grip nuts including the steps of punching nut blanks from suitable metal stock, said blanks having a straight central bore and side walls of outwardly tapering thickness whereby an excess of metal is contained in the crown portion of the blank, threading the straight central bore and thereafter converging the top portion of the thread in the crown portion to bring the side walls into parallelism and reduce the diameter thereof.

5. The method of preparing grip nuts having standard exterior dimensions comprising preparing perforated nut blanks in such a manner that said blanks are somewhat larger in their exterior top portions than in their bottom portions, threading said blanks with a standard, uniform helical thread and thereafter reducing the enlarged outside dimensions of the threaded nut blanks by lateral pressure applied to the said enlarged portions and simultaneously reducing the enlarged portions and the diameter of the threaded convolutions adjacent the said enlarged portions.

6. The method of preparing nut blanks as defined in claim 5 wherein the larger top portions of the threaded blanks are subjected to lateral pressure and reduced to the size of their bottom portions.

EDWARD J. COLE.